United States Patent
Broekhuijsen (10) Patent No.: US 11,042,421 B1
(45) Date of Patent: Jun. 22, 2021

(54) MODIFYING SYSTEM-DEFINED USER INTERFACE CONTROL FUNCTIONALITY ON A COMPUTING DEVICE

(71) Applicant: Ivanti, Inc., South Jordan, UT (US)

(72) Inventor: Jerome Broekhuijsen, Highland, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 16/355,950

(22) Filed: Mar. 18, 2019

Related U.S. Application Data (63) Continuation of application No. 12/904,882, filed on Oct. 14, 2010, now Pat. No. 10,235,216.

(60) Provisional application No. 61/251,852, filed on Oct. 15, 2009.

(51) Int. Cl.
*G06F 9/54* (2006.01)
*G06F 9/451* (2018.01)
*G06F 9/48* (2006.01)
*G06F 9/46* (2006.01)

(52) U.S. Cl.
CPC .............. *G06F 9/54* (2013.01); *G06F 9/451* (2018.02); *G06F 9/46* (2013.01); *G06F 9/48* (2013.01)

(58) Field of Classification Search
CPC ... G06F 9/54; G06F 9/451; G06F 9/48; G06F 9/46
See application file for complete search history.

(56) References Cited

U.S. PATENT DOCUMENTS

| | | | |
|---|---|---|---|
| 5,899,987 A * | 5/1999 | Yarom | G06F 9/4401 |
| 6,023,721 A * | 2/2000 | Cummings | G06F 9/4843 |
| | | | 707/999.008 |
| 6,105,036 A | 8/2000 | Henckel | |
| 6,335,743 B1 | 1/2002 | Owings | |
| 6,567,977 B1 * | 5/2003 | Kumar | G06F 8/61 |
| | | | 717/174 |
| 6,678,734 B1 * | 1/2004 | Haatainen | H04L 29/06 |
| | | | 709/203 |

(Continued)

OTHER PUBLICATIONS

Rod Stephens, "Add Flexible Sort Capabilities to ListView Controls," dated Apr. 3, 2007 (Year: 2007).*

(Continued)

*Primary Examiner* — Benjamin C Wu (57) ABSTRACT

A method for modifying a system-defined user interface control on a computing device is described. The method includes wrapping, on the computing device, a system-defined control within a programmer-defined control at run-time and modifying functionality of the system-defined control at run-time. Modifying functionality includes intercepting an initial message for a system-defined control, preventing the system-defined control from rendering and rendering a programmer-defined control in place of the system-defined control. Modifying functionality also includes intercepting a message for the system-defined control, determining whether the message requires modified functionality and providing modified functionality if the message requires modified functionality. Modifying functionality also includes sending the message to the system-defined control if the message does not require modified functionality and providing regular functionality if the message does not require modified functionality.

15 Claims, 7 Drawing Sheets

(56) References Cited

U.S. PATENT DOCUMENTS

| | | | | |
|---|---|---|---|---|
| 7,512,956 B1* | 3/2009 | Nicholes | ............... | G06F 9/455 709/250 |
| 10,235,216 B1 | 3/2019 | Broekhuijsen | | |
| 2002/0054046 A1 | 5/2002 | Evans et al. | | |
| 2002/0178302 A1* | 11/2002 | Tracey | ............... | G06F 9/451 719/328 |
| 2003/0110307 A1* | 6/2003 | De Armas | ............... | G06F 9/546 719/310 |
| 2004/0025165 A1* | 2/2004 | Desoli | ............... | G06F 9/54 719/310 |
| 2004/0111673 A1* | 6/2004 | Bowman | ............... | G06F 9/451 715/234 |
| 2004/0237071 A1 | 11/2004 | Hollander et al. | | |
| 2005/0005067 A1 | 1/2005 | Culter et al. | | |
| 2007/0100877 A1 | 5/2007 | Paoli et al. | | |
| 2007/0150816 A1 | 6/2007 | Hariki | | |
| 2009/0128573 A1* | 5/2009 | Lambe | ............... | G06F 16/40 345/530 |
| 2010/0077304 A1* | 3/2010 | Zaman | ............... | G06F 3/0481 715/702 |
| 2010/0079498 A1* | 4/2010 | Zaman | ............... | G06F 3/04883 345/661 |
| 2013/0055369 A1* | 2/2013 | Kumar | ............... | H04L 9/3247 726/7 |

OTHER PUBLICATIONS

Office Action for U.S. Appl. No. 12/904,882, dated Oct. 27, 2017, 20 pages.
Office Action for U.S. Appl. No. 12/904,882, dated Jun. 23, 2016, 18 pages.
Office Action for U.S. Appl. No. 12/904,882, dated Aug. 5, 2015, 15 pages.
Office Action for U.S. Appl. No. 12/904,882, dated Mar. 13, 2015, 15 pages.
Office Action for U.S. Appl. No. 12/904,882, dated Jul. 16, 2014, 15 pages.
Office Action for U.S. Appl. No. 12/904,882, dated Jun. 21, 2013, 16 pages.
Office Action for U.S. Appl. No. 12/904,882, dated May 16, 2018, 19 pages.
Office Action for U.S. Appl. No. 12/904,882, dated Jan. 31, 2017, 18 pages.
Office Action for U.S. Appl. No. 12/904,882, dated Feb. 16, 2016, 17 pages.
Office Action for U.S. Appl. No. 12/904,882, dated Nov. 6, 2014, 15 pages.
Office Action for U.S. Appl. No. 12/904,882, dated Dec. 5, 2013, 18 pages.
WaybackMachine, "Chapter 6: Inheritance," Smalltalk Tutorial, Apr. 2009, Retrieved from the Internet: <URL: http://web.archive.org/web/20090402150526/http://www.inf.ufsc.br/poo/smalltalk/ibm/tutorial/chap6.html>, Retrieved on Jun. 12, 2013, 7 pages.
Stephens, R., "Add Flexible Sort Capabilities to ListView Controls," Apr. 3, 2007, Retrieved from the Internet: <URL: http://www.devx.com/print/dotnet/Article/34199>, Retrieved on: Jun. 13, 2013, 9 pages.
Microsoft Corporation, "Microsoft Releases Windows Mobile 5.0," May 10, 2005, Retrieved from the Internet: <URL: http://www.microsoft.com/en-us/news/press/2005/may05/05-10windowsmobile5pr.aspx>, Retrieved on Jun. 13, 2013, 3 pages.
Dunn, S., Microsoft Corporation, "Sorting ListView Items by Column Using Windows Forms," Jul. 2002, Retrieved from the Internet: <URL: http://msdn.microsoft.com/en-us/library/ms996467(printer).aspx>, Retrieved on: Nov. 9, 2010, 9 pages.
Microsoft Corporation, "How to: Sort ListView Items," Retrieved from the Internet: <URL: http://msdn.microsoft.com/en-us/library/ms229643(printer).aspx>, Retrieved on Nov. 9, 2010, 7 pages.

* cited by examiner

MODIFYING SYSTEM-DEFINED USER INTERFACE CONTROL FUNCTIONALITY ON A COMPUTING DEVICE

RELATED APPLICATIONS

This application is a continuation of U.S. patent application Ser. No. 12/904,882, filed Oct. 14, 2010, entitled "MODIFYING SYSTEM-DEFINED USER INTERFACE CONTROL FUNCTIONALITY ON A COMPUTING DEVICE," now issued as U.S. Pat. No. 10,235,216, which claims the benefit of U.S. Provisional Patent Application No. 61/251,852, filed Oct. 15, 2009, entitled "MODIFYING SYSTEM-DEFINED USER INTERFACE CONTROL FUNCTIONALITY ON A COMPUTING DEVICE," the disclosure of each of which is hereby incorporated herein by reference in its entirety.

TECHNICAL FIELD

The present disclosure relates generally to computers and computer-related technology. More specifically, the present disclosure relates to modifying system-defined user interface control functionality on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems. These computers include software, such as applications including user interfaces, in order to make them useful and accessible to an end user.

Software developers produce software applications that include one or more user interfaces. However, software developers are often limited by the development tools that are available to them. Therefore, there is a need for systems and methods that allow software developers to expand the functionality of software components that are provided by development tools. Thus, benefits may be realized by providing improved systems and methods that change system-defined control functionality.

DETAILED DESCRIPTION

Software application developers using user interface (UI) toolkits may often be limited by the set of software controls offered by the maker of the user interface toolkit. For example, if an application developer is unable to find a desired control or otherwise configure an existing control to meet his needs, then he is left to either create an entirely new control or to redesign the application user interface to work around the absence of the desired control. Creating a new control may often be difficult, time consuming, and prone to errors. Systems and methods for modifying system-defined user interface control functionality are disclosed herein.

The systems and methods disclosed herein may allow a forms-designing developer to continue using a system-defined control. The developer may create and edit the system-defined control through established mechanisms in a user interface builder (e.g., a form designer). The developer may not need to duplicate existing functionality for creating and editing the system-defined control. The application developer may leverage existing desired functionality and focus directly on making changes to modify and extend existing functionality. Thus, the developer may potentially avoid considerable duplication in developing user interface controls. With the systems and methods disclosed herein, application developers may quickly provide functionality to end users that is wanted and needed but not directly provided by the maker of the user interface toolkit. In particular, a developer may leverage existing functionality for placing and editing a provided (i.e., system-defined) control. Those changes may then be applied to the new (i.e., programmer-defined) control at run time.

A method for modifying a system-defined user interface control on a computing device is disclosed. The method includes wrapping, on the computing device, a system-defined control within a programmer-defined control at run-time and modifying functionality of the system-defined control at run-time. Modifying functionality includes intercepting an initial message for a system-defined control, preventing the system-defined control from rendering and rendering a programmer-defined control in place of the system-defined control. Modifying functionality also includes intercepting a message for the system-defined control, determining whether the message requires modified functionality and providing modified functionality if the message requires modified functionality. Modifying functionality also includes sending the message to the system-defined control if the message does not require modified functionality and providing regular functionality if the message does not require modified functionality.

The method may also include, if the message requires modified functionality, modifying the message to produce a modified message and sending the modified message to the system-defined control. The method may also include handling the message separately from the system-defined control if the message requires modified functionality. Handling the message separately from the system-defined control may include one selected from the group consisting of discarding the message and performing an operation independently from the system-defined control.

The method may also include calling combined functionality if the message requires modified functionality. Combined functionality may include system-defined control functionality in combination with programmer-defined control functionality. Wrapping the system-defined control may include defining features of the programmer-defined control based on features of the system-defined control.

The system-defined control may be a ListView control, and functionality of the ListView control may be modified such that columns within the ListView control are sortable. The method may be performed using a Microsoft® Windows Mobile® 5 environment.

A computing device configured for modifying a system-defined user interface control is also disclosed. The computing device includes a processor and instructions stored in memory. The computing device wraps a system-defined control within a programmer-defined control at run-time and modifies functionality of the system-defined control at run-time. Modifying functionality includes intercepting an initial message for a system-defined control, preventing the system-defined control from rendering and rendering a programmer-defined control in place of the system-defined control. Modifying functionality also includes intercepting a message for the system-defined control, determining whether the message requires modified functionality and providing modified functionality if the message requires modified functionality. Modifying functionality also includes sending the message to the system-defined control if the message does not require modified functionality and providing regular functionality if the message does not require modified functionality.

A non-transitory, tangible computer-readable medium for modifying a system-defined user interface control is also disclosed. The computer-readable medium includes executable instructions for wrapping a system-defined control within a programmer-defined control at run-time and modifying functionality of the system-defined control at run-time. Modifying functionality includes intercepting an initial message for a system-defined control, preventing the system-defined control from rendering and rendering a programmer-defined control in place of the system-defined control. Modifying functionality also includes intercepting a message for the system-defined control, determining whether the message requires modified functionality and providing modified functionality if the message requires modified functionality. Modifying functionality also includes sending the message to the system-defined control if the message does not require modified functionality and providing regular functionality if the message does not require modified functionality.

Figure 1:
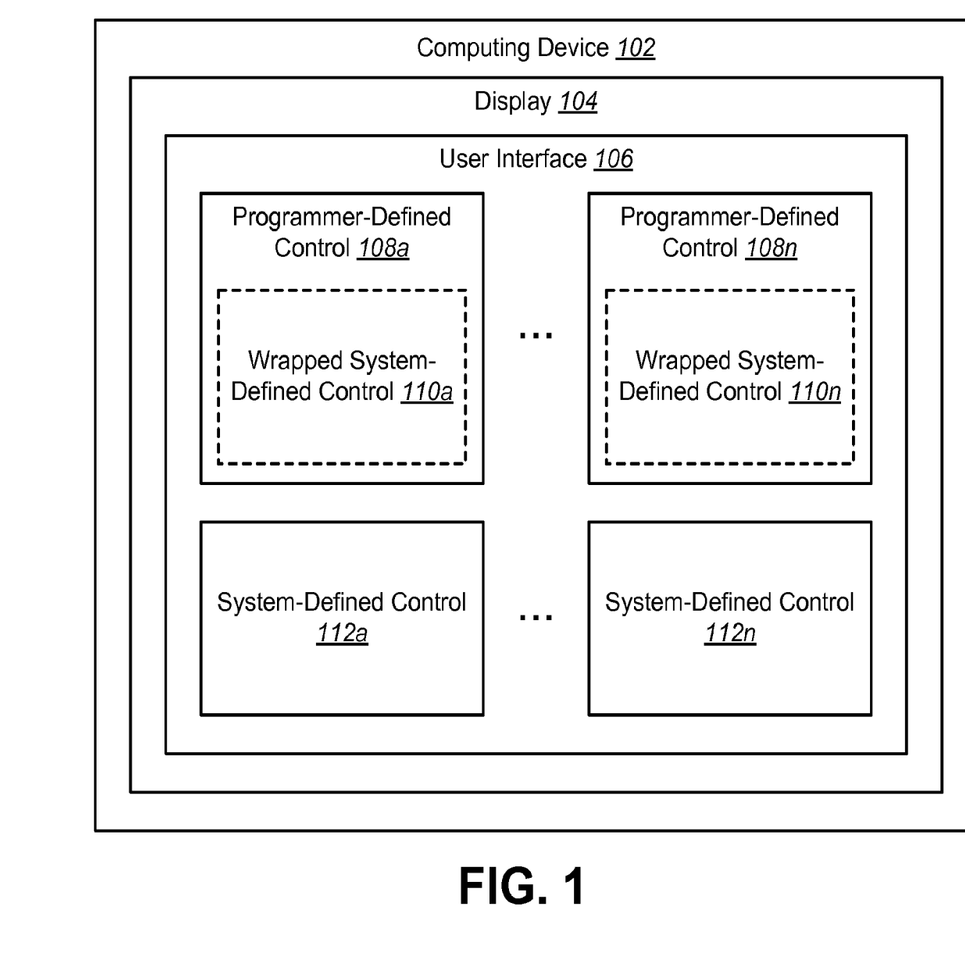
FIG. 1 is a block diagram illustrating a computing device.

FIG. 1 is a block diagram illustrating a computing device 102. Examples of a computing device include a desktop computer, server, portable electronic device (e.g., cell phone, laptop, tablet, netbook, personal digital assistant (PDA), Symbol-based (e.g., Microsoft® Windows Mobile® 5) hand-held computer, portable audio player (e.g., MP3 player, iPod®, etc.)) or other programmable electronic device. The computing device 102 may include a display 104. The display 104 may be any kind of display known in the art. For example, the display 104 may be a liquid crystal display (LCD), plasma display, television, monitor, projector, touch screen, etc. The display 104 may display one or more user interfaces (UIs) 106. For example, the user interface 106 may be a graphical user interface that a user may interact with via an input device. The user interface 106 may include one or more system-defined controls 112*a-n*. The system-defined controls 112*a-n* may be system-defined user interface controls. For example, the system-defined controls 112*a-n* may comprise any combination of one or more text box(es), check box(es), radio button(s), slider(s), label(s), frame(s), table(s), drop-down list(s), button(s), toggle button(s), image(s), video player(s), list(s), hyperlink(s) and/or any other user interface control known in the art. The system-defined controls 112*a-n* may be templated controls where a user (e.g., programmer) may insert a system-defined control into the user interface 106 for use. The system-defined controls 112*a-n* may allow a user to view and/or interact with the user interface 106 (and/or its underlying application).

The user interface 106 may include one or more programmer-defined controls 108*a-n*. The programmer-defined controls 108*a-n* may include wrapped system-defined controls 110*a-n*. The wrapped system-defined controls 110*a-n* may be system-defined user interface controls 112*a-n* that have been wrapped by the programmer-defined controls 108*a-n*. Wrapping may occur at run-time. For instance, a programmer-defined control 108 may reference the object code of a wrapped system-defined control 110*a* at run-time. Examples of wrapped system-defined controls 110*a-n* include one or more text box(es), check box(es), radio button(s), slider(s), label(s), frame(s), table(s), drop-down list(s), button(s), toggle button(s), image(s), video player(s), list(s), hyperlink(s) and/or any other user interface control. The wrapped system-defined controls 110*a-n* may be templated controls where a user may insert (e.g., program) a control into the user interface for use. The wrapped system-defined controls 110*a-n* may allow a user to view and/or interact with the user interface 106 (and/or its underlying application). In one configuration, the wrapped system-designed control 110*a* is a ListView (e.g., table) control.

The programmer-defined controls 108*a-n* may modify the functionality of the wrapped system-defined controls 110*a-n*. More specifically, the programmer-defined controls 108*a-n* may change the functionality of the wrapped system-defined controls 110*a-n* and/or may add more functionality to (e.g., extend) the wrapped system-defined controls 110*a-n*. For example, a wrapped system-defined control 110 may provide modified or different functionality compared to the functionality provided by the unwrapped (e.g., templated or unmodified) version of the wrapped system-defined controls 110*a-n*, as in a comparable system-defined control 112 of the same type. For example, the unwrapped (e.g., templated) version of the ListView control provided by Microsoft® in the Windows Mobile® 5 environment may not support column sorting functionality. However, the ListView control 110*a* may be wrapped in a programmer-defined control 108*a*. This programmer-defined control 108*a* extends the functionality of the ListView control 110*a* such that the programmer-defined control 108*a* supports templated ListView functionality but also provides column-sorting functionality. A programmer-defined control 108 may modify the functionality of a wrapped system-defined control 110 by intercepting messages (e.g., events) for the wrapped system-defined control 110. The programmer-defined control 108 may perform some operation based on the intercepted message, such as discarding the message, modifying and passing the message to the wrapped system-defined control or performing some operation independent of the wrapped system-defined control.

Many different configurations or approaches may be used by a programmer-defined control 108 in order to provide the modified functionality in conjunction with or separate from a wrapped system-defined control 110. For the sake of explanation, assume that a wrapped system-defined ListView control 110*a* provides cut-and-paste functionality that is typically unmodifiable. However, suppose that such cut-and-paste functionality is not desired for a particular application. A programmer-defined ListView control 108 may intercept cut-and-paste messages and discard them, thus provided modified functionality at run-time.

Figure 2:
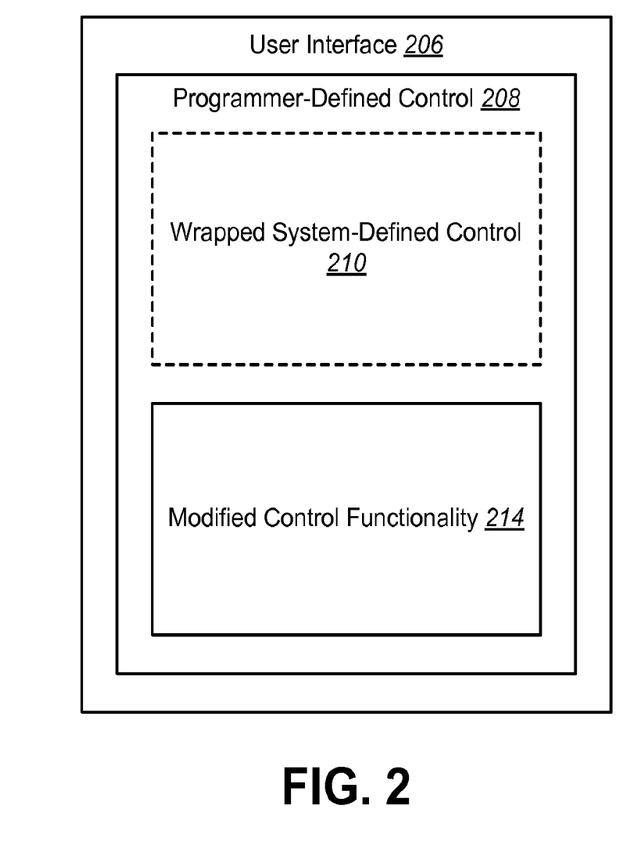
FIG. 2 is a block diagram illustrating one configuration of a user interface.

FIG. 2 is a block diagram illustrating one configuration of a user interface 206. A user interface 206 may include a programmer-defined control 208. The programmer-defined control 208 may include a wrapped system-defined control 210. Examples of wrapped system-defined controls 210 include one or more text box(es), check box(es), radio button(s), slider(s), label(s), frame(s), table(s), drop-down list(s), button(s), toggle button(s), image(s), video player(s), list(s) or any other user interface control known in the art. The programmer-defined control 208 may include modified and/or extended control functionality 214. The programmer-defined control 208 wraps the wrapped system-defined control 210 and adds modified control functionality 214 to the wrapped system-defined control 210. The modified control functionality 214 may change and/or extend the functionality of the wrapped system-defined control 210. The programmer-defined control 208 may thus allow a user to access typical or templated system-defined control functionality while changing and/or extending wrapped system-defined control 210 functionality.

Figure 3:
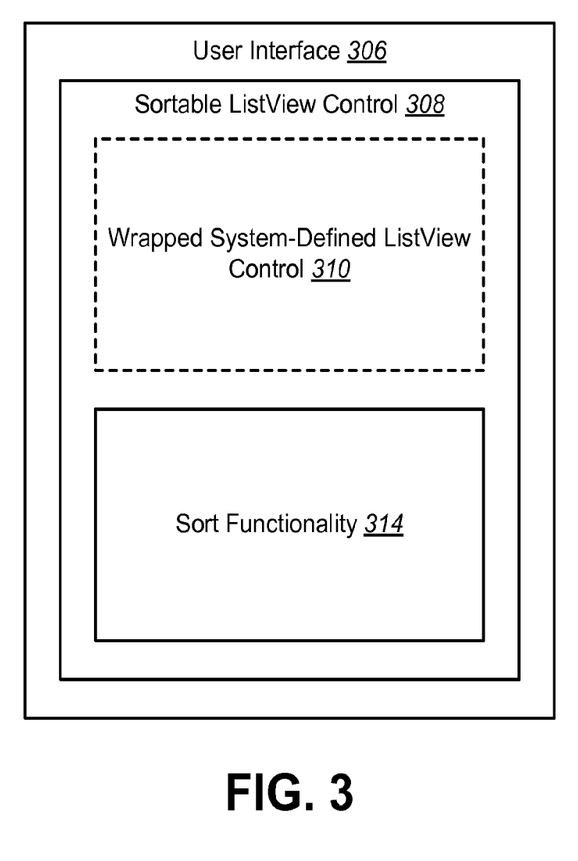
FIG. 3 is a block diagram illustrating another configuration of a user interface.

FIG. 3 is a block diagram illustrating another configuration of a user interface 306. More specifically, FIG. 3 illustrates one example of an extended system-defined control. In this example, column-sortable ListView controls (e.g., tables) 308 on a Symbol-based (e.g., Microsoft® Windows Mobile® 5) hand-held computer are created. The user interface 306 may include a wrapped system-defined (e.g., templated) ListView control 310. The wrapped system-defined ListView control 310 displays data in a list or table format. An unwrapped (e.g., templated) system-defined ListView (e.g., table) control provided by Microsoft® in the Windows Mobile® 5 environment may provide ListView controls that do not support sortable columns. More specifically, the unwrapped (e.g., templated) version of a system-defined ListView control does not provide functionality for sorting the contents (e.g., rows) of a column (e.g., alphabetically, numerically, chronologically, etc.). However, the systems and methods disclosed herein extend system-defined ListView control functionality such that the user interface 306 may include a sortable ListView control 308. The sortable ListView control 308 may be a programmer-defined user interface control that leverages the templated functionality of a wrapped system-defined ListView control 310 and adds sort functionality 314 to the wrapped system-defined ListView control 310. The wrapped system-defined ListView control 310 in an application may be wrapped in the programmer-defined (e.g., sortable) ListView control 308. The functionality of the system-defined ListView 310 may be modified (e.g., extended) by adding sort functionality 314 to the system-defined ListView control 310.

The wrapped system-defined ListView control 310 may be intercepted at run-time. This wrapped system-defined ListView control 310 may be hidden (e.g., not rendered) on the user interface 306. In its place, the programmer-defined (sortable) ListView 308 may be revealed (e.g., rendered) on the user interface 306. In effect, the sortable ListView 308 control takes the place of the system-defined ListView control 310.

The user interface 306 may receive commands or interaction. For instance, a sensor may provide input (e.g., touch input, keyboard input, cursor input, sound input, image input, accelerometer input or other data) to the hand-held computer that houses the user interface 306. This input may be captured from a user, for example. The input may correspond to the sortable ListView control 308. For instance, a user may interact with the sortable ListView control 308 via the user interface 306.

When input corresponds to the sortable ListView control 308, one or more messages may be provided for the wrapped system-defined ListView control 310. However, the (programmer-defined) sortable ListView control 308 may intercept these messages and provide functionality based on these messages. For instance, if a user attempts to input data into the wrapped system-defined ListView control 310, the sortable ListView control 308 may (intercept and) pass the message to the wrapped system-defined ListView control 310, assuming that inputting data into a system-defined ListView control 310 does not require the additional sort functionality 314 provided by the sortable ListView control 308. More specifically, the sortable ListView control 308 may detect a "click" (e.g., a mouse-up event) and text input (e.g., text input events) corresponding to a cell in a table provided by the sortable ListView control 308. Because these operations do not require additional sort functionality 314, the sortable ListView control 308 may pass these events to the wrapped system-defined ListView control 310 and provide the (regular or unmodified) behavior or functionality of the wrapped system-defined ListView control 310.

However, assume that an input corresponds to sort functionality 314 that is not provided by the wrapped system-defined ListView control 310. For instance, a click event (e.g., mouse-up event) may occur on one of the column headers of a table provided by the sortable ListView control 308, signifying a sort operation. The sortable ListView control 308 may intercept this message or event to sort the column or table. In one configuration, the sortable ListView control 308 may modify this message using sort functionality 314 and pass it to the wrapped system-defined ListView control 310 such that the wrapped system-defined ListView control 310 provides a sorted column or table. In another configuration, the sortable ListView control 308 may obtain table contents from the wrapped system-defined ListView control 310 and map them to sorted locations using sort functionality 314.

Figure 4:
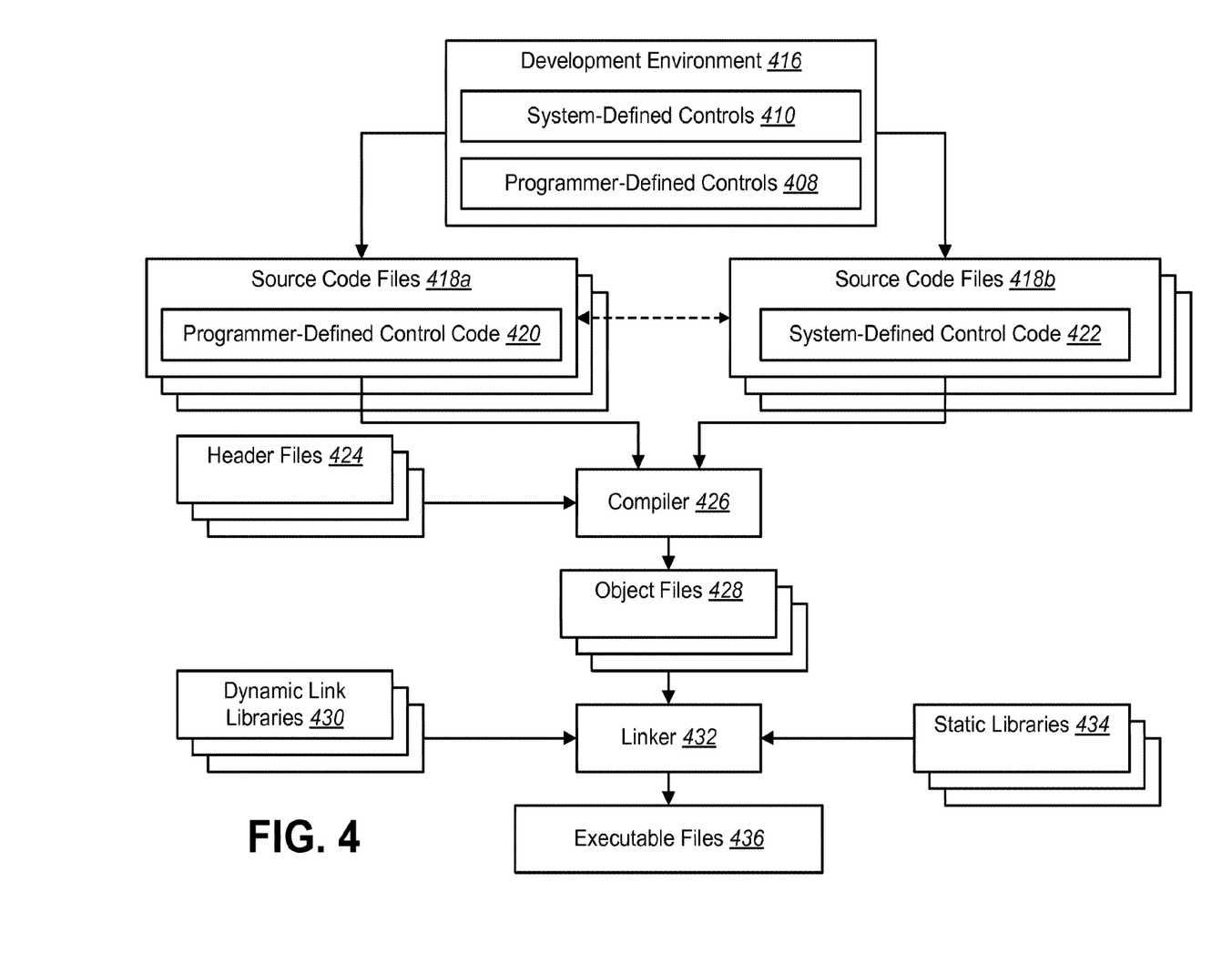
FIG. 4 is a block diagram illustrating one example of a system for generating executable code wherein a method for modifying system-defined user interface control functionality on a computing device may be practiced.

FIG. 4 is a block diagram illustrating one example of a system for generating executable code wherein a method for modifying system-defined user interface control functionality on a computing device may be practiced. A development environment 416 may be a software and/or hardware module that may aid in developing software (e.g., programs). The development environment 416 generally provides resources used to develop software. For example, the development environment 416 provides an environment for coding and debugging software. Some examples of development environments may include the Windows Mobile® 5 toolkit, Microsoft® Visual Studio®, Xcode®, etc. The development environment 416 also provides code libraries and control templates. That is, system-defined controls 410 may be included in the development environment. Furthermore, programmer-defined controls 408 may be developed such that they are included in the development environment 416.

The system-defined controls 410 may be user interface control templates. The system-defined controls 410 may be pre-defined control templates in one or more libraries provided by the development environment 416 provider. Some examples of system-defined controls 410 include Buttons, Canvases, CheckBoxes, ComboBoxes, DocumentViewers, Frames, Grids, Images, Labels, ListBoxes, ListViews, Menus, Panels, PasswordBoxes, Popups, ProgressBars, PrintDialogs, Radiobuttons, RichTextBoxes, Scrollbars, Sliders, StatusBars, TextBlocks, TextBoxes, ToolBars, ToolTips, etc. These system-defined controls 410 include system-defined, default or templated functionality. That is, system-defined controls 410 may include limited functions and/or behaviors.

The programmer-defined controls 408 may be user interface controls that wrap and modify system-defined control 410 functionality. In modifying system-defined control 410 functionality, the programmer-defined controls 408 may change and/or extend the functionality of system-defined controls 410. A programmer may define or include certain functionality in the programmer-defined controls 408. That is, the programmer-defined controls 408 may modify (i.e., change and/or extend) the functionality of system-defined controls 410 as specified by a programmer.

The source code files 418a-b may be files that include computing device programming statements written in a particular computing device programming language. The computing device programming language may be human-readable. For example, the computing device programming language may be Java, C, C++, C#, Objective-C, Visual Basic, Visual Basic .NET, etc. Some portions of the source code files 418a-b may be modifiable by a programmer while other portions may not be.

One or more source code files 418b may include system-defined control code 422. That is, one or more source code files 418b include programming language source code that defines the system-defined controls 410 and their functionality. Portions or all of the system-defined control code 422 may not be modifiable by a programmer. For example, the provider of a system-defined control 410 may limit a programmer's ability to access or modify portions or all of the system-defined control code 422. Thus, the functionality of system-defined controls 410 may be limited and not readily modifiable.

One or more source code files 418a may include programmer-defined control code 420. That is, one or more source code files 418a includes programming language source code that defines the programmer-defined controls 408 and their functionality. A programmer may write and/or change source code files 418a in order to define programmer-defined control code 420. In turn, programmer-defined control 408 functionality can be created and/or changed. The programmer-defined control code 420 may be associated with the system-defined control code 422.

The programmer-defined control code 420 may be written and associated with the system-defined control code 422 in such a way that programmer-defined controls 408 may wrap system-defined controls 410. More specifically, the programmer-defined control code 420 may enable the programmer-defined controls 408 to intercept messages for the system-defined controls 410 when the system-defined controls 410 are wrapped in programmer-defined controls 408. The programmer-defined controls 408 may use the intercepted messages to modify (i.e., change and/or extend) the functionality of the system-defined controls 410 when wrapped by the programmer-defined controls 408. Furthermore, when a programmer-defined control 408 wraps a system-defined control 410, the programmer-defined control 408 may use properties and/or functions associated with the system-defined control 410. More specifically, a programmer-defined control 408 may define its properties and/or functions based on the properties and/or functions associated with a system-defined control 410. A programmer-defined control 408 may use default and/or modified properties and/or functions associated with the system-defined control 410. For example, if a programmer has access to change the dimensions of a system-defined text box control on a user interface, then the programmer-defined control 408 may similarly adjust its own dimensions. It should be noted that while it may be possible in some cases to employ inheritance, it is often the case that the system-defined control 410 cannot be inherited. Thus, the functionality may be wrapped by creating a new object that contains a reference to the system-defined control code 422. This wrapping may take place at run-time.

A compiler 426 may be a hardware and/or software module that translates source code files 418a-b into object code or object files 428. In other words, the compiler 426 compiles the source code files 418a-b to generate the object code or object files 428. In some cases, the compiler 426 may also use header files 424 to compile the source code files 418a-b. Header files 424 may include declarations of functions, classes, variables, and/or other identifiers, for example. Thus, the compiler 426 may translate the source code files 418a-b into object code or object files 428 (optionally using header files 424). The object files 428 may be files that contain collections of objects or object code. The objects or object code in the object files 428 may be sequences of computer instructions.

A linker 432 may be a hardware and/or software module that links object code or object files 428 to dynamic link libraries 430 and/or static libraries 434 in order to generate one or more executable files 436. The dynamic link libraries 430 and the static libraries 434 may include sequences of computer instructions. The sequences of computer instructions may be objects or object code. The linker 432 links objects contained in the dynamic link libraries 430 and/or the static libraries 434 to the object code or object files 428. The static libraries 434 may contain sequences of computer instructions (e.g., objects) that are copied and/or linked by the linker 432 at compile time. The dynamic link libraries 430 may contain sequences of computer instructions (e.g., objects) that are linked by the linker 432, but may be loaded at run-time. The linker 432 may generate an executable file 436 by linking the sequences of computer instructions in the dynamic link libraries 430 and/or static libraries 434 to the object code or object files 428. The executable file 436 may be a file that is executable by a computing device.

It should be noted that FIG. 4 illustrates only one approach for generating executable code. However, some environments (e.g., Apple's Xcode with InterfaceBuilder) may work differently, with the output of a form designer being objects instead of compilable code. Although one approach is illustrated in FIG. 4, the systems and methods disclosed herein may be used with many approaches to generating executable code or objects. For example, the systems and methods disclosed herein may be used with Microsoft's Visual Studio and/or Apple's Xcode. For instance, the InterfaceBuilder development environment may provide objects. In one configuration, a system-defined control object may be associated with a programmer-defined control object such that the system-defined control is "wrapped" by the programmer-defined control. This may allow the programmer-defined control to intercept messages for the system-defined control and provide modified functionality. In one configuration, a programmer-defined control may be a separate object from a system-defined control.

Figure 5:
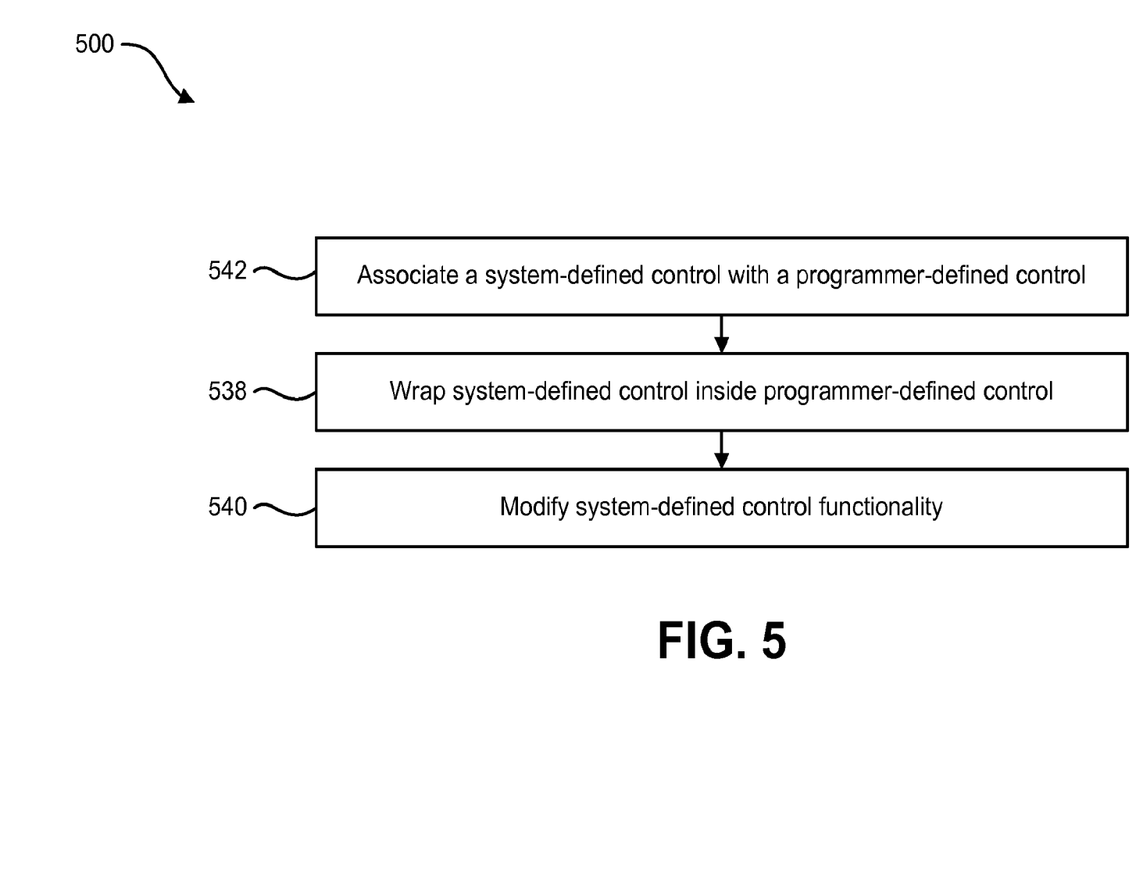
FIG. 5 is a flow diagram illustrating one configuration of a method for modifying system-defined user interface control functionality.

FIG. 5 is a flow diagram illustrating one configuration of a method 500 for modifying system-defined user interface control functionality. A computing device 102 may associate 542 a system-defined control with a programmer-defined control. For example, a programmer-defined control may be associated 542 with the system-defined control by referencing the system-defined control code. More specifically, an instance of the programmer-defined control may be associated with an instance of the system-defined control such that the programmer-defined control may intercept messages directed to the system-defined control. In one configuration, instantiated programmer-defined control code may reference system-defined control code (e.g., object code).

The computing device 102 may wrap 538 a system-defined control 112 inside a programmer-defined control 108. At run-time, for example, a programmer-defined control 108 may reference the object code or object files of the wrapped system-defined control 110. When a wrapped system-defined control 110 is called for rendering, for instance, the programmer-defined control 108 may intercept this message, prevent the wrapped system-defined control 110 from rendering and render itself 108 instead of the wrapped system-defined control (using wrapped system-defined control 110 features). Wrapping 538 the programmer-defined control 108 may comprise defining some of its 108 features (e.g., properties and/or functions) based on the features (e.g., properties and/or functions) of the system-defined control 112. Thus, the wrapped system-defined control 110 may be editable by a forms-designing developer while the programmer-defined control 108 may reflect those edits.

The computing device 102 may modify 540 system-defined control 112 functionality at run-time. That is, the programmer-defined control 108 may change and/or extend wrapped system-defined control 110 functionality. A programmer may define the programmer-defined control 108 to modify (i.e., change or extend) the functionality of the wrapped system-defined control 110 while maintaining some or all of the existing (e.g., templated) functionality of a system-defined control 112. For example, the programmer-defined control 108 may intercept messages (e.g., events) for the wrapped system-defined control 110. The programmer-defined control 108 may modify and pass messages to the wrapped system-defined control 110, discard the messages and/or use the messages to provide functionality independent from or in conjunction with the wrapped system-defined control 110 (based on the programmer-defined control 108 definition). This may modify (i.e., change and/or extend) the behavior of templated controls on a user interface 106. An end-user may utilize the modified (i.e., changed and/or extended) functionality from a programmer-defined control 108 with a wrapped system-defined control 110 placed in an application.

Figure 6:
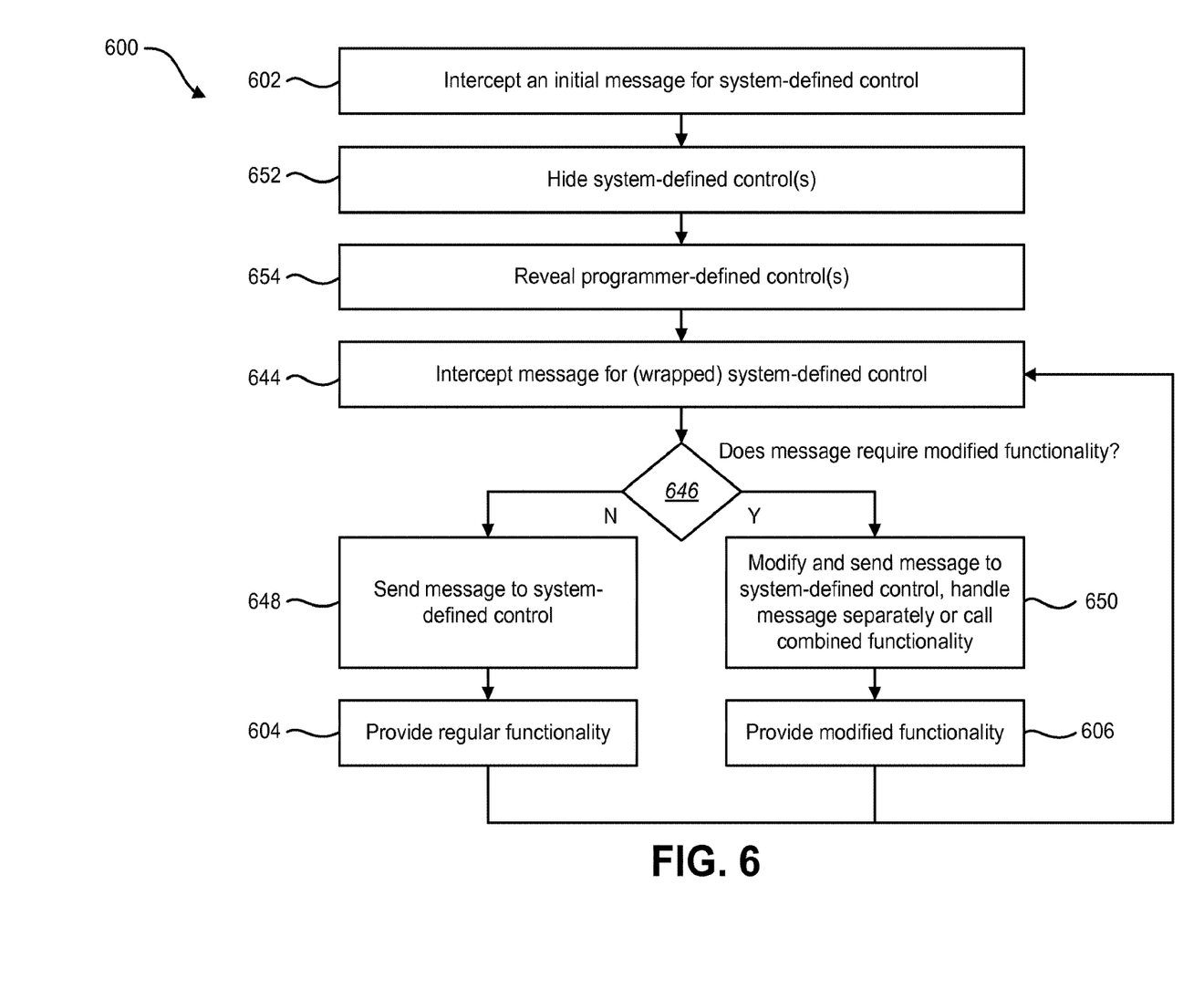
FIG. 6 is a flow diagram illustrating a more specific configuration of a method for modifying system-defined control functionality on a computing device.

FIG. 6 is a flow diagram illustrating a more specific configuration of a method 600 for modifying system-defined control 112 functionality on a computing device 102. A computing device 102 may intercept 602 an initial message for one or more system-defined controls 112 in an application. This interception 602 may occur at the time that the user interface is rendered. For example, when a message is sent to a (wrapped) system-defined control 110 for rendering, the computing device 102 may intercept 602 this message. The computing device 102 may then hide 652 the one or more wrapped system-defined controls 110 and reveal 654 programmer-defined controls 108 in their place. For example, the wrapped system-defined control 110 may be hidden (not rendered) 652 and the corresponding (wrapping) programmer-defined control 108 may be revealed 654 or rendered in its place. More specifically, the computing device 102 may hide 652 the wrapped system-defined control 110. For example, the computing device 102 may prevent the system-defined control 112 (or wrapped system-defined control 110) from rendering on the user interface 106. The computing device 102 may reveal 654 the programmer-defined control 108. For example, the computing device 102 may cause the programmer-defined control 108 to render on the user interface 106. In this manner, the computing device 102 may render the programmer-defined control 108 in place of the wrapped system-defined control 110 on the user interface 106.

The computing device 102 may intercept 644 a message for the wrapped system-defined control 110. For example, this interception 644 may occur when a user interacts with the control. For example, the user may assume that he is interacting with a wrapped system-defined control 110 when he is actually interacting with a programmer-defined control 108. Appropriate event handlers for the programmer-defined control 108 may be called in reaction to user interaction events (such as a click on a column header in a wrapped ListView 310, for example). If the user interaction can be adequately handled by the wrapped system-defined control 110 (thus leveraging that pre-defined functionality without re-implementing it), then the programmer-defined control's event handler may call the wrapped system-defined control's event handler. This may be done in the source code 420 for the programmer-defined control's event handler (as described below).

More specifically, the programmer-defined control 108 may intercept 644 a message that may interact with the wrapped system-defined control 110. For example, messages subsequent to the initial rendering message (such as from events generated by the user interacting with the control) may be intercepted 644 by the programmer-defined control 108 and then either handled by the programmer-defined control 108 and/or passed along to the wrapped system-defined control 110. The programmer-defined control 108 may determine 646 whether the message requires modified functionality of a wrapped system-defined control 110. If the message does not require the modified functionality, the programmer-defined control 108 may send 648 the message to the wrapped system-defined control 110. In this manner, the wrapped system-defined control 110 may continue to function as it would in its unmodified form (e.g., as an equivalent system-defined control 112) when the message would not require functionality that is modified by the programmer-defined control 108. In other words, the computing device 102 may provide 604 regular functionality by using the wrapped system-defined control 110.

If the message requires modified functionality, the computing device 102 may take one of several approaches, depending on control functionality. In one approach, the programmer-defined control 108 may modify 650 the message and send it to the wrapped system-defined control 110. In another approach, the programmer-defined control 108 may handle 650 the message separately from the wrapped system-defined control 110. In yet another approach, the programmer-defined control 108 may call 650 combined functionality. For example, the programmer-defined control 108 may modify 650 the message and send it to the wrapped system-defined control 110 such that the wrapped system-defined control 110 exhibits modified functionality. Thus, the computing device 102 may provide 606 modified functionality from the wrapped system-defined control 110 by modifying and sending 650 the message to the wrapped system-defined control 110 such that it provides functionality that is different from an unmodified (e.g., unwrapped) system-defined control 112.

The programmer-defined control 108 may handle 650 the message separately by, for example, discarding the message and/or performing a function based on the message. For example, some control interactions or functions may require only functionality that is provided solely by the programmer-defined control 108 (and not the wrapped system-defined control 110). Thus, the message may be handled separately by the programmer-defined control 108 such that the wrapped system-defined control 110 does not contribute any functionality to the operation at hand. Rather, the programmer-defined control 108 may provide 606 the modified functionality. It should be noted that modified functionality may include simply discarding the message such that no operation is performed, where an operation would have been performed by an unmodified (e.g., unwrapped) system-defined control 112.

The computing device 102 may call 650 combined functionality. For example, the programmer-defined control 108 may send the message or a modified message to the wrapped system-defined control 110 and may also perform one or more operations based on the message. For instance, the programmer-defined control 108 may send a message or modified message to the wrapped system-defined control 110 in order to evoke some behavior or functionality from the wrapped system-defined control 110. The programmer-defined control 108 may also perform some operation in addition to and/or based on the behavior or functionality provided by the wrapped system-defined control 110. Thus, the programmer-defined control 108 may provide 606 modified functionality by providing functionality in addition to and/or based on functionality provided by the wrapped system-defined control 110. For example, the programmer-defined control 108 may provide 606 modified functionality in response to user interaction that is a hybrid of wrapped system-defined control functionality and programmer-defined functionality. In this manner, the system-defined control 112 functionality may be modified (i.e., changed and/or extended). It should be noted that if more messages are sent to the wrapped system-defined control 110, the computing device 102 may repeat operations as illustrated in FIG. 6.

The method 600 illustrated in FIG. 6 may occur at run-time. This is different from other approaches that offer modification of existing functionality without having to inherit, redefine or re-implement an existing class. For example, one approach that offers such modification involves Objective-C's "categories." More specifically, categories are extensions to existing (such as system-defined) classes. Methods may be overridden, modified or extended in a category without having to inherit from, redefine or re-implement an existing class. Using Objective-C's categories, for instance, a developer can work with the system-defined class and gain the behavior modifications/extensions implicitly.

The systems and method presented herein may also use existing system-defined controls which cannot be inherited from and which are impractical to redefine or re-implement. As discussed above, the systems and methods disclosed herein may be used to create new objects which have modified or extended functionality and which otherwise leverage the existing functionality of the system-defined controls 112. However, one difference between the systems and methods disclosed herein and categories is that categories are compile-time enhancements to existing classes, whereas the systems and methods disclosed herein involve run-time interception to provide enhanced or modified behavior or functionality.

Figure 7:
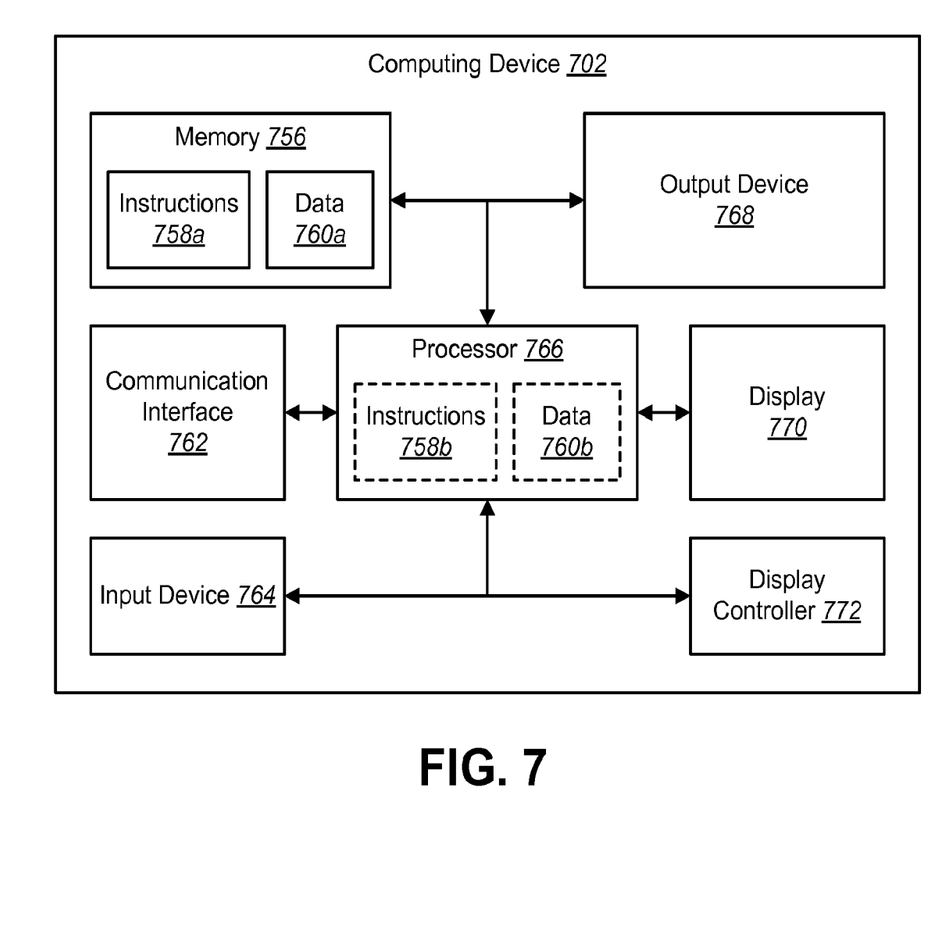
FIG. 7 illustrates various components that may be utilized on a computing device for implementing a method for modifying system-defined user interface control functionality.

FIG. 7 illustrates various components that may be utilized on a computing device for implementing a method for modifying system-defined user interface control functionality. The illustrated components may be located within the same physical structure or in separate housings or structures.

The computing device 702 may include a processor 766 and memory 756. The processor 766 controls the operation of the computing device 702 and may be embodied as a microprocessor, a microcontroller, a digital signal processor (DSP) or other device known in the art. The memory 756 may include instructions 758*a* and data 760*a*. The processor 766 typically performs logical and arithmetic operations based on program instructions 758*a* and data 760*a* stored within the memory 756. That is, instructions 758*b* and data 760*b* may be stored and/or run on the processor 766.

The computing device 702 typically may include one or more communication interfaces 762 for communicating with other electronic devices. The communication interfaces 762 may be based on wired communication technology, wireless communication technology, or both. Examples of different types of communication interfaces 762 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 702 typically may include one or more input devices 764 and one or more output devices 768. Examples of different kinds of input devices 764 include a keyboard, mouse, microphone, remote control device, button, joystick, trackball, touchpad, lightpen, etc. Examples of different kinds of output devices 768 include a speaker, printer, etc. One specific type of output device which may be typically included in a computer system is a display device 770. Display devices 770 used with embodiments disclosed herein may utilize any suitable image projection technology, such as a cathode ray tube (CRT), liquid crystal display (LCD), light-emitting diode (LED), gas plasma, electroluminescence, or the like. A display controller 772 may also be provided, for converting data stored in the memory 756 into text, graphics, and/or moving images (as appropriate) shown on the display device 770.

Of course, FIG. 7 illustrates only one possible configuration of a computing device wherein methods for modifying system-defined control functionality on a computing device may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An apparatus, comprising:
a memory; and
a processor operatively coupled to the memory, the processor configured to:
define a set of features of a programmer-defined control based on a set of features of a system-defined control, wherein:
the set of features of the system-defined control including a property and a function associated with the system-defined control,
the system-defined control providing a first functionality, and
the programmer-defined control providing a second functionality that is an extension of the first functionality;
wrap the system-defined control in the programmer-defined control such that the programmer-defined control uses the set of features of the system-defined control;
associate the programmer-defined control with the system-defined control such that messages for the system-defined control are intercepted by the programmer-defined control and such that an edit to the set of features of the system-defined control is reflected in the set of features of the programmer-defined control;
after the programmer-defined control is associated with the system-defined control, render on a user interface the programmer-defined control;
receive, after the rendering and at run-time, a first message associated with a user interaction event on the user interface;
when the user interaction event does not require the second functionality, send the first message to the system-defined control such that the system-defined control performs a first operation based on the user interaction event; and
when the user interaction event requires the second functionality:
determine whether the second functionality can be provided; and
in response to determining that the second functionality can be provided:
obtain information from the system-defined control; and
perform a second operation to the information independent of the system-defined control.

2. The apparatus of claim 1, wherein the processor is further configured to in response to determining that the second functionality cannot be provided, discard the first message.

3. The apparatus of claim 1, wherein:
the system-defined control is a ListView control for displaying a table;
the programmer-defined control is configured to provide the second functionality of sorting contents of the table; and
the processor is configured to render the programmer-defined control by displaying on the user interface a sortable table including the contents of the table.

4. The apparatus of claim 1, wherein:
when the user interaction event is a mouse-up event, the processor is configured to determine that the mouse-up event requires the second functionality; and when the user interaction event is a text input event, the processor is configured to determine that the text input event does not require the second functionality.

5. The apparatus of claim 1, wherein the processor is further configured to render a set of programmer-defined controls and a set of system-defined controls on the user interface in addition to rendering the programmer-defined control.

6. An apparatus, comprising:
a memory; and
a processor operatively coupled to the memory, the processor configured to:
define a set of features of a programmer-defined control based on a set of features of a system-defined control, wherein:
the set of features of the system-defined control including a property and a function associated with the system-defined control,
the system-defined control providing a first functionality, and
the programmer-defined control providing a second functionality that is an extension of the first functionality;
wrap the system-defined control in the programmer-defined control such that the programmer-defined control uses the set of features of the system-defined control;
associate the programmer-defined control with the system-defined control such that messages for the system-defined control are intercepted by the programmer-defined control and such that an edit to the set of features of the system-defined control is reflected in the set of features of the programmer-defined control;
after the programmer-defined control is associated with the system-defined control, render on a user interface the programmer-defined control;
receive, after the rendering and at run-time, a first message associated with a user interaction event on the user interface;
when the user interaction event does not require modifying the first message to implement the second functionality, send the first message to the system-defined control such that the system-defined control performs a first operation based on the user interaction event; and
when the user interaction event requires modifying the first message to implement the second functionality:
modify the first message based on the second functionality to produce a second message; and
send the second message to the system-defined control such that the system-defined control performs a second operation based on the user interaction event, the second operation being different from the first operation.

7. The apparatus of claim 6, wherein:
the system-defined control is a ListView control for displaying a table;
the programmer-defined control is configured to provide the second functionality of sorting contents of the table; and
the processor is configured to render the programmer-defined control by displaying on the user interface a sortable table including the contents of the table.

8. The apparatus of claim 6, wherein the second operation implements the second functionality.

9. The apparatus of claim 6, wherein the second operation implements the second functionality that is different from the first functionality.

10. The apparatus of claim 6, wherein:
the processor is configured to, prior to the rendering, receive a request at the run-time for the system-defined control, and
the processor is configured to render the programmer-defined control while not rendering the system-defined control in response to receiving the request.

11. The apparatus of claim 6, wherein the processor is further configured to, when the user interaction event requires modifying the first message, perform a third operation based on the user interaction event and independent of the system-defined control.

12. A method, comprising:
defining a set of features of a programmer-defined control based on a set of features of a system-defined control, wherein:
the set of features of the system-defined control including a property and a function associated with the system-defined control,
the system-defined control providing a first functionality, and
the programmer-defined control providing a second functionality that is an extension of the first functionality;
wrapping the system-defined control in the programmer-defined control such that the programmer-defined control uses the set of features of the system-defined control;
associating the programmer-defined control with the system-defined control such that messages for the system-defined control are intercepted by the programmer-defined control and such that an edit to the set of features of the system-defined control is reflected in the set of features of the programmer-defined control;
after the programmer-defined control is associated with the system-defined control, rendering, via a compute device and at run-time, the programmer-defined control on a user interface;
intercepting, via the compute device and after the rendering, a first message associated with a user interaction event on the user interface;
determining whether the user interaction event requires the second functionality;
in response to determining that the user interaction event does not require the second functionality, sending the first message to the system-defined control such that the system-defined control performs a first operation based on the user interaction event; and
in response to determining that the user interaction event requires the second functionality:
discarding the first message; and
performing a second operation independent of the system-defined control, the second operation being different from the first operation.

13. The method of claim 12, wherein:
the system-defined control is a ListView control for displaying a table;
the programmer-defined control is configured to provide the second functionality of sorting contents of the table; and
the rendering including displaying on the user interface a sortable table including the contents of the table.

14. The method of claim 12, wherein the performing the second operation includes implementing the second functionality.

15. The method of claim 12, wherein the performing the second operation includes implementing another functionality different from the first functionality of the system-defined control and the second functionality.

\* \* \* \* \*